United States Patent [19]
Bronstein

[11] 4,293,192
[45] Oct. 6, 1981

[54] SOLAR REFLECTOR WITH FLEXIBLE SHEET TIGHTLY SECURED AROUND FORM SURFACES

[76] Inventor: Allen I. Bronstein, 541 Bryson Ave., Palo Alto, Calif. 94306

[21] Appl. No.: 153,016

[22] Filed: May 27, 1980

[51] Int. Cl.$^3$ ............................ G02B 7/18; G02B 5/10
[52] U.S. Cl. ............................... 350/296; 350/310; 113/116 J
[58] Field of Search ............... 350/296, 293, 310, 320; 126/438; 248/474; 113/116 J; 72/295, 296, 297

[56] References Cited

U.S. PATENT DOCUMENTS

| | | | |
|---|---|---|---|
| 4,119,365 | 10/1978 | Powell | 350/293 |
| 4,173,397 | 11/1979 | Simpson | 350/296 |
| 4,240,406 | 12/1980 | Hutchison | 350/293 |

FOREIGN PATENT DOCUMENTS 2738665  3/1979  Fed. Rep. of Germany ...... 350/296

*Primary Examiner*—Jon W. Henry
*Attorney, Agent, or Firm*—Melvin R. Stidham

[57] ABSTRACT

A solar trough reflector including two forms with identical surfaces, preferably convex parabolic curves. The form members are carried on a longitudinal slideway in which at least one is free to slide. Positive mechanical means, such as a threaded screw, moves the slide to adjusted position on a slideway. Gripping means hold a flexible sheet with a reflecting surface tightly around the convex surfaces and then the adjusted means moves the slidable form away from the other to tension sheet. The entire slideway is pivoted on support members so that the trough so formed may be tilted to receive the direct rays of the sun.

14 Claims, 14 Drawing Figures

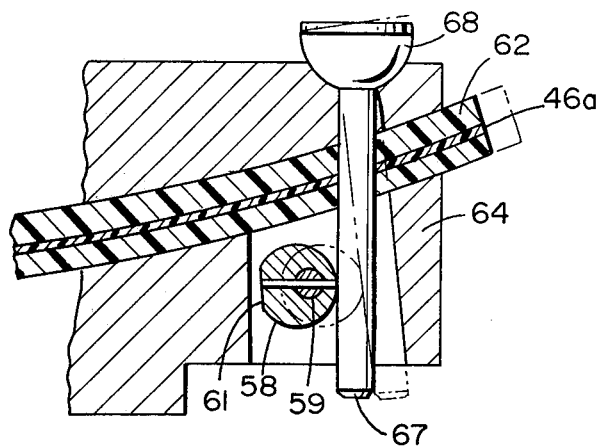
FIG. 8
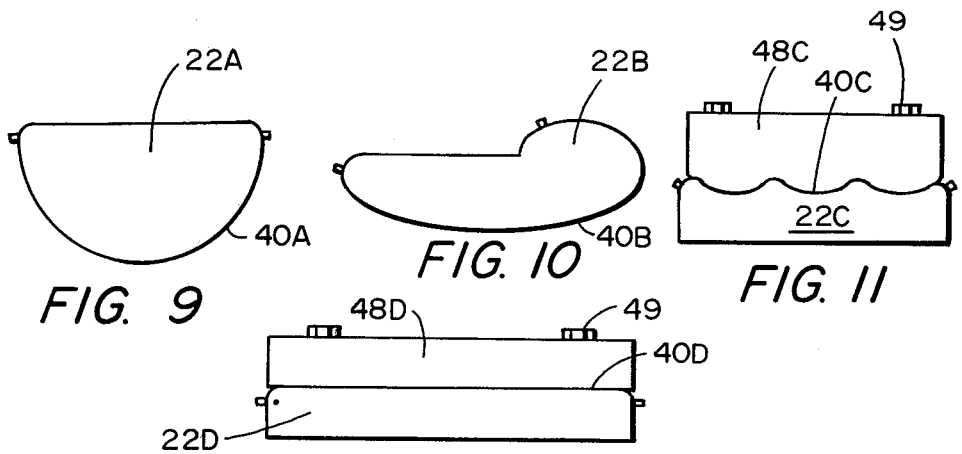
FIG. 9　　FIG. 10　　FIG. 11
FIG. 12
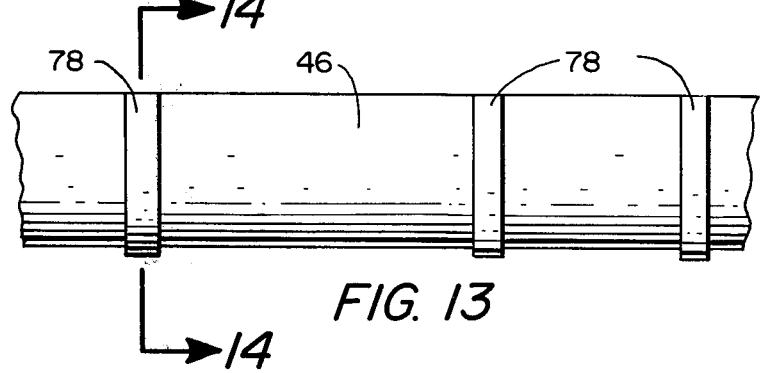
FIG. 13

SOLAR REFLECTOR WITH FLEXIBLE SHEET TIGHTLY SECURED AROUND FORM SURFACES

BACKGROUND OF THE INVENTION

Generally, reflecting solar troughs are made of shiny metal sheets which are backed by supporting ribs. Primarily because of manufacturing limitations at the mill, there are necessarily restrictions on the areas of the sheets. Consequently, a multiplicity of reflectors are often required for a given solar energy project. As a rule, the sheets with rigid supporting ribs, are assembled at plant site because of the difficulty and expense in attempting to assemble the sheets and ribs in the field. As a result, the mirrors are heavy and bulky and difficult to ship, adding further costs to the finished product.

OBJECTS OF THE INVENTION

It is an object of this invention to provide a solar reflector that is inexpensive to manufacture and assemble.

It is a further object of this invention to provide a solar reflector which is collapsible and portable.

It is a further object of this invention to provide a concave solar reflector which will maintain its true configuration without requirement of supporting ribs.

Other objects and advantages of this invention will become apparent from the description to follow, particularly when read in conjunction with the accompanying drawing.

SUMMARY OF THE INVENTION

In carrying out this invention, I provide a slideway on which are supported two form members having identical surfaces around a portion of their periphery which conform precisely to the configuration of the reflecting surface, as for example, a parabolac. A sheet of highly reflective material is wrapped tightly around the surfaces and secured in place and, at least one of the forms, being mounted on a slide, is moved away from the other until the flexible sheet is in tension, conforming precisely to the curve of the form surfaces over its full length. The slideway is pivoted on support legs so that it may be tilted at a selected angle, depending on the angle of the sun. Strips of tape, preferably of a foam material may be adhered to the outer or convex surface of the material to dampen it against wind vibration.

BRIEF DESCRIPTION OF THE DRAWINGS

In the drawings:

FIG. 8 is a partial section view of the sheet securing means of FIG. 7;

FIGS. 9, 10, 11 and 12 are plan views showing alternate form configurations;

FIG. 13 is a partial side view of a flexible sheet with dampening tape; and

DESCRIPTION OF A PREFERRED EMBODIMENT

Figure 1:
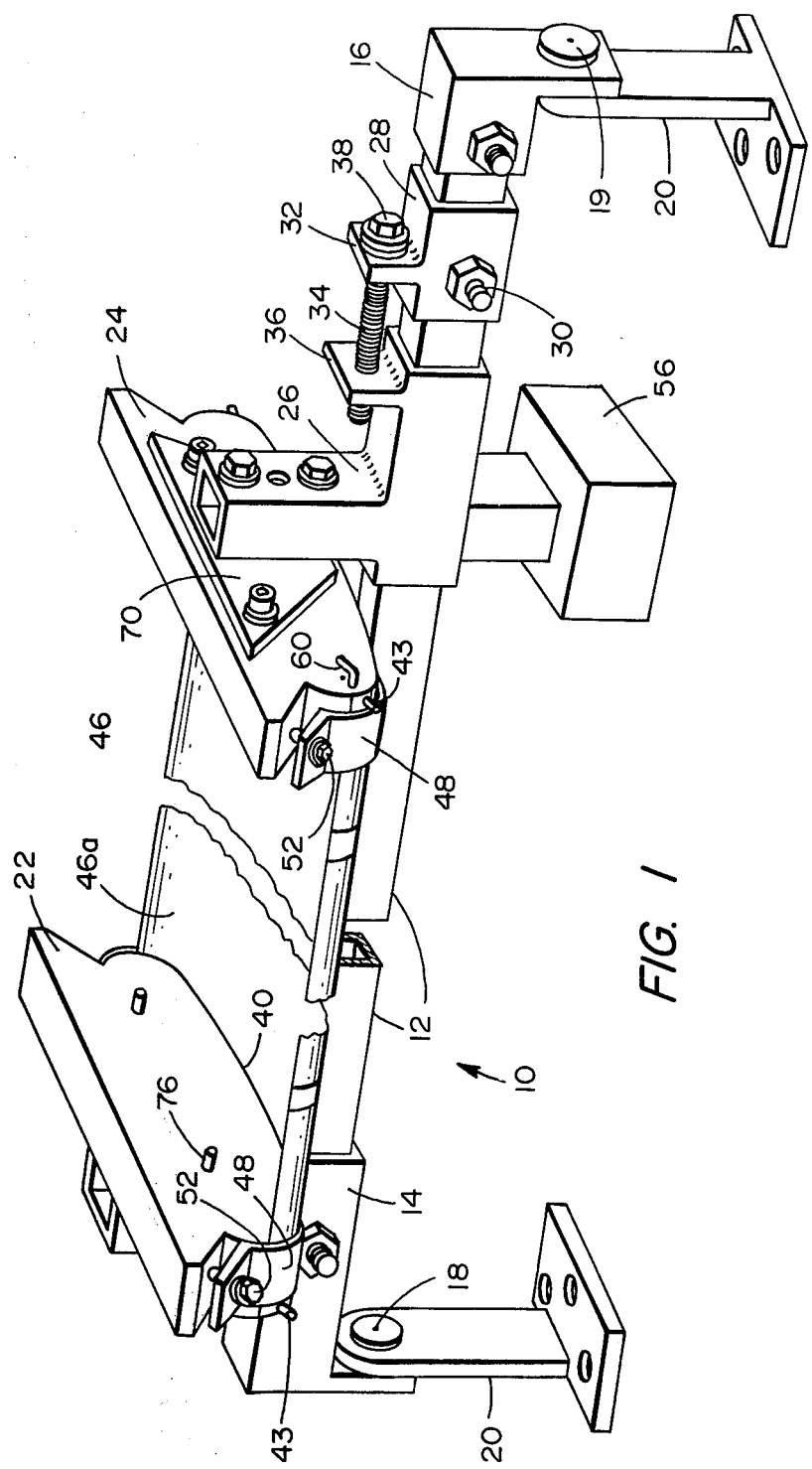
FIG. 1 is a view in perspective of a solar reflecting trough embodying features of this invention.

Referring now to FIG. 1 with greater particularity, the reflective solar trough 10 of this invention comprises a rail or a slideway 12 which is carried at opposite ends in mountings 14 and 16. The mountings are, in turn pivoted at 18 to support legs 20 so that by turning the knob 19, the trough may be positioned at any angle with respect to the horizon in order to catch the solar rays directly. A pair of parallel forms 22 and 24 are supported on the slideway 12, one of which 22 is secured to the mounting 14 and the other being carried on a slide 26 which is movable along the slideway 12.

An anchor member 28 is secured in a selected position along the rail 12 by means of a screw 30. A lug 32 on the anchor 28 rotatably receives a screw 34, which is threaded into an opposing lug 36 carried on the form slide 26. Hence, by turning the bolt head 38 the lugs 32 and 36 are drawn toward or away from each other to adjusted position.

Figure 2:
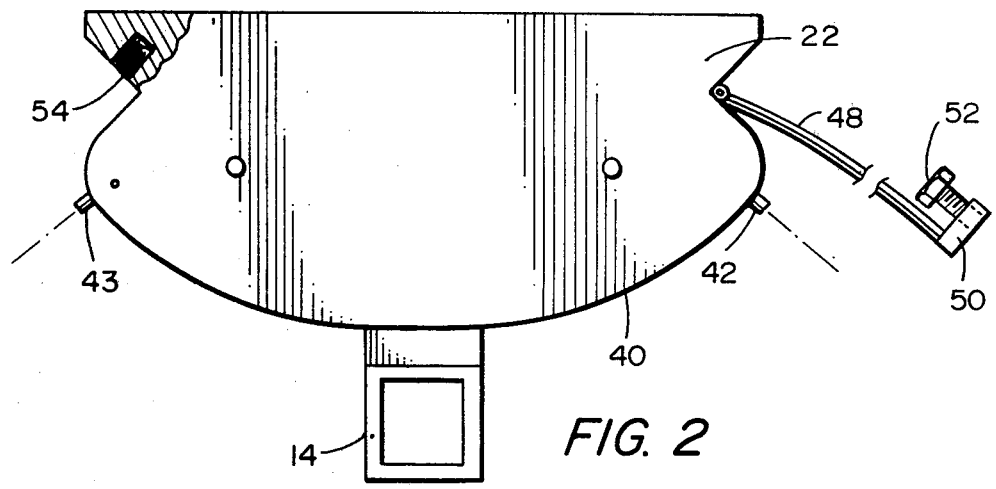
FIG. 2 is an end view of a trough form member showing registration means.
Figure 3:
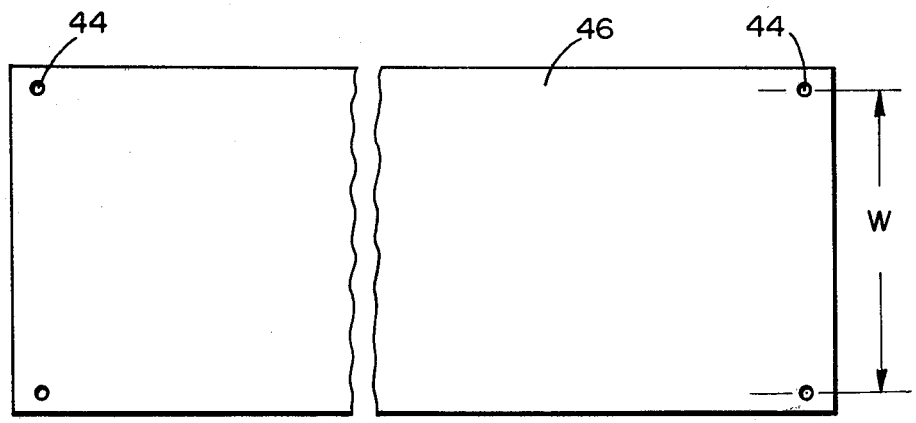
FIG. 3 is a top view of a flexible sheet used to form the reflective trough.

Referring now to FIGS. 2 and 3 along with FIG. 1, the forms 22 and 24 have identical surfaces 40 thereon which are finished to the precise curvature desired in the reflective trough. At the opposite ends of the surfaces 40 are securing pins 42 and 43 which are adaptable to be received in complementary perforations 44 at the opposite ends of the reflective flexible sheet 46. With the sheet 46 mounted, the arcuate spacing between the pins 42 and 43 is at least as great, and preferably slightly greater than the spacing W between the perforations 44 so that the sheet 46 is stretched tightly when wrapped over the surface 44. Thus, it is the function of the pins 42 and 43 to tension the sheet 46 around the curve 40 so as to assume the curvature thereof. In addition, the pins 42 and 43 of each form 22 is in a plane which is perpendicular to the track or slideway 12 and the planes of the two sets of pins 42 and 43 are precisely parallel. Accordingly the pins will ensure the proper orientation of the sheet 46 in the curvature of the surfaces 40 from end to end.

Finally, a strap of leather or plastic with a metal reinforcing is wrapped around the sheet to clamp it firmly against the surface 40. A lug 50 at the end of the belt 48 carries a bolt 52 which is threaded into a tapped opening 54 at the other side of form 22 to tension the strap 48 firmly against the flexible sheet 46.

While the flexible sheet 46 may be of a thin metallic sheet or foil I prefer to use an aluminized polyester film, such as that sold under the trademark "Mylar". This material is highly reflective, and may be coated so that its reflective properties are retained over a period of several months despite continuous exposure to weather. The material has relatively high tensile strength and retains good physical properties, including dimensional stability over a wide temperature range. Moreover, it can be provided in sheets which are up to ten feet in width, thus providing maximum reflecting surface.

In any event, the flexible sheet 46 is wrapped around the curved surfaces 40 of the parallel forms 22 and 24 and secured as above described. Then, the nut 38 is turned to draw the slide 26 toward the anchor 28 and, therefore, away from the form 22 until the flexible sheet 46 is firmly tensioned. When so tensioned, the concave surface 46a conforms precisely to the form surfaces 40 over the full length of the flexible sheet 46.

Hence, we have described a reflective solar trough 10 which may be shipped broken down to the site and the trough itself formed there as described. Then, the entire slideway may be tilted by rotating knob 19 to catch the sun's rays directly, rotation of the assembly being facilitated by a counter weight 56 which balances the weight of the forms 22 and 24.

Figure 6:
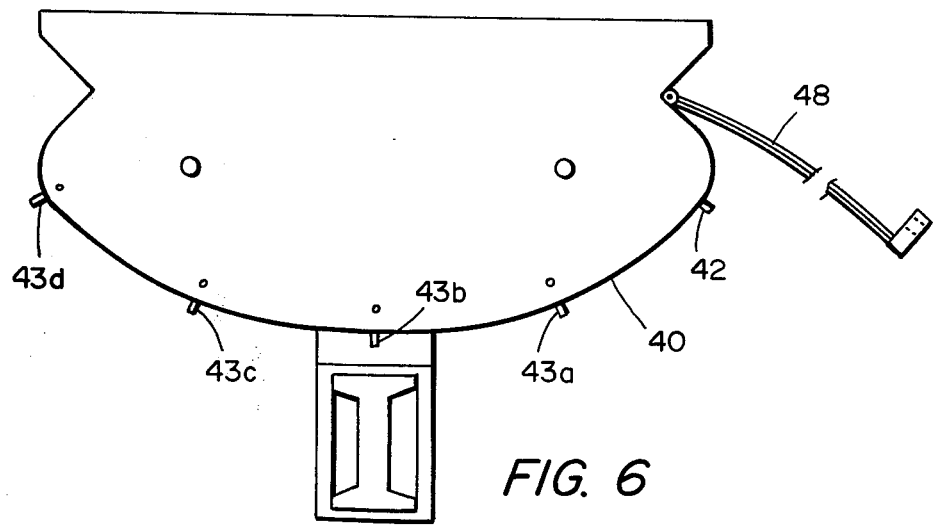
FIG. 6 is an end view of a form showing another type of sheet securing means.

Referring now to FIGS. 9 through 12, the parabolic curve 40 of FIG. 6 may, instead, be a cylindrical surface 40A as on the form 22A of FIG. 9; it may be of spiral configuration 40B, as on the form member 22B of FIG. 10; it may have multiple parabolic troughs 40C, as on the form 22C of FIG. 11; or it may be a flat surface 40D as on the form 22D of FIG. 12. In both of the forms 22C and 22D, the flexible sheet may be held in place by means of a complementary clamping member 48C or 48D which is held in place by means of cap screws 49.

Figure 14:
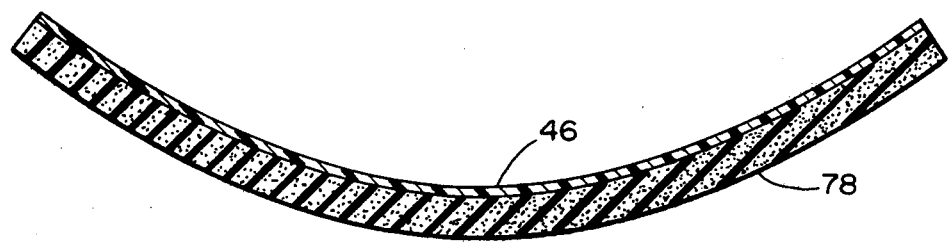
FIG. 14 is a section view taken along line 14—14 of FIG. 13.

Referring to FIGS. 13 and 14, one or more strips of tape 78 may be applied around the outer side of the flexible sheet 46 after it tensioned to dampen it against wind vibrations by preventing the transmission thereof along the length of the trough. While virtually any tape will accomplish this, I prefer to use a tape of a foam plastic, which has considerable vibration dampening and absorbing characteristics.

Figure 5:
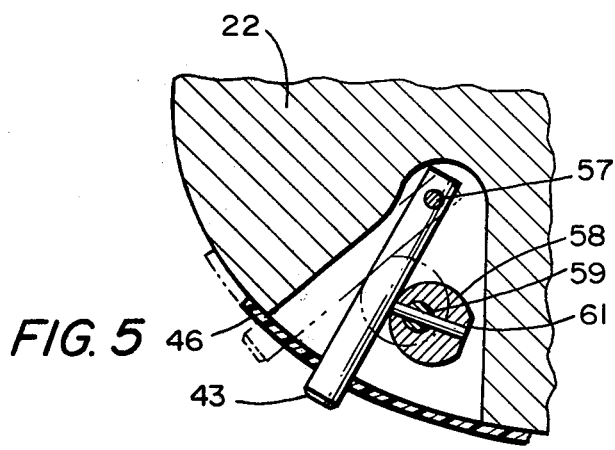
FIG. 5 is a partial section view taken along line 5—5 of FIG. 4.

Referring now to FIG. 5 the tensioning of the flexible sheet 46 around the form curve 40 may be facilitated by making one of the pins 43 adjustable along the curve 40. For example, as shown in FIG. 5, the pin 43 may be pivoted at 57 and is engaged by an eccentric 58 which is carried on a shaft 59 to be turned by a small lever 60 (FIG. 1) carried on the form. A flat surface 61 may be provided on the eccentric to prevent dislodgement of the pin 43. If desired, a series of adjustable pins 43a, 43b, 43c and 43d (FIG. 6) may be provided along the convex surface 40 so that multiple flexible sheets 46 may be tensioned progressively.

Figure 4:
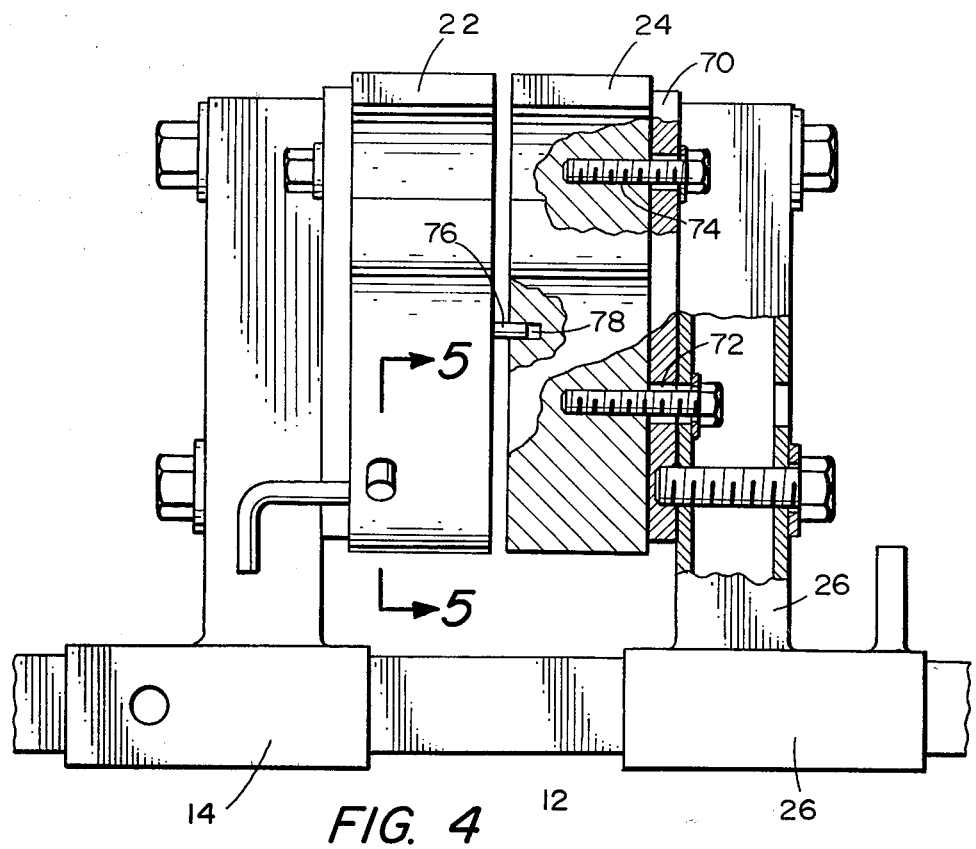
FIG. 4 is a side view of the apparatus showing the form aligning means.

Considering FIGS. 1 and 4 together, the forms 22 and 24 are mounted on plates 70 which are carried on the fixed mounting 14 and the slide 26. The plates 70 are slotted at 72 and cap screws 74 which are threaded into the forms 22 and 24 extend through the slots. With the cap screws 74 loosened, the forms 22 and 24 may be moved together to the position shown in FIG. 4 wherein alignment pins 76 in the form 22 are received in complementary holes 78 in the form 24, insuring precise alignment. Then, the cap screws 74 are tightened to secure the forms in place. With this adjustment, each element of the curve 40 on one of the forms is in precise alignment with the corresponding element on the other.

Figure 7:
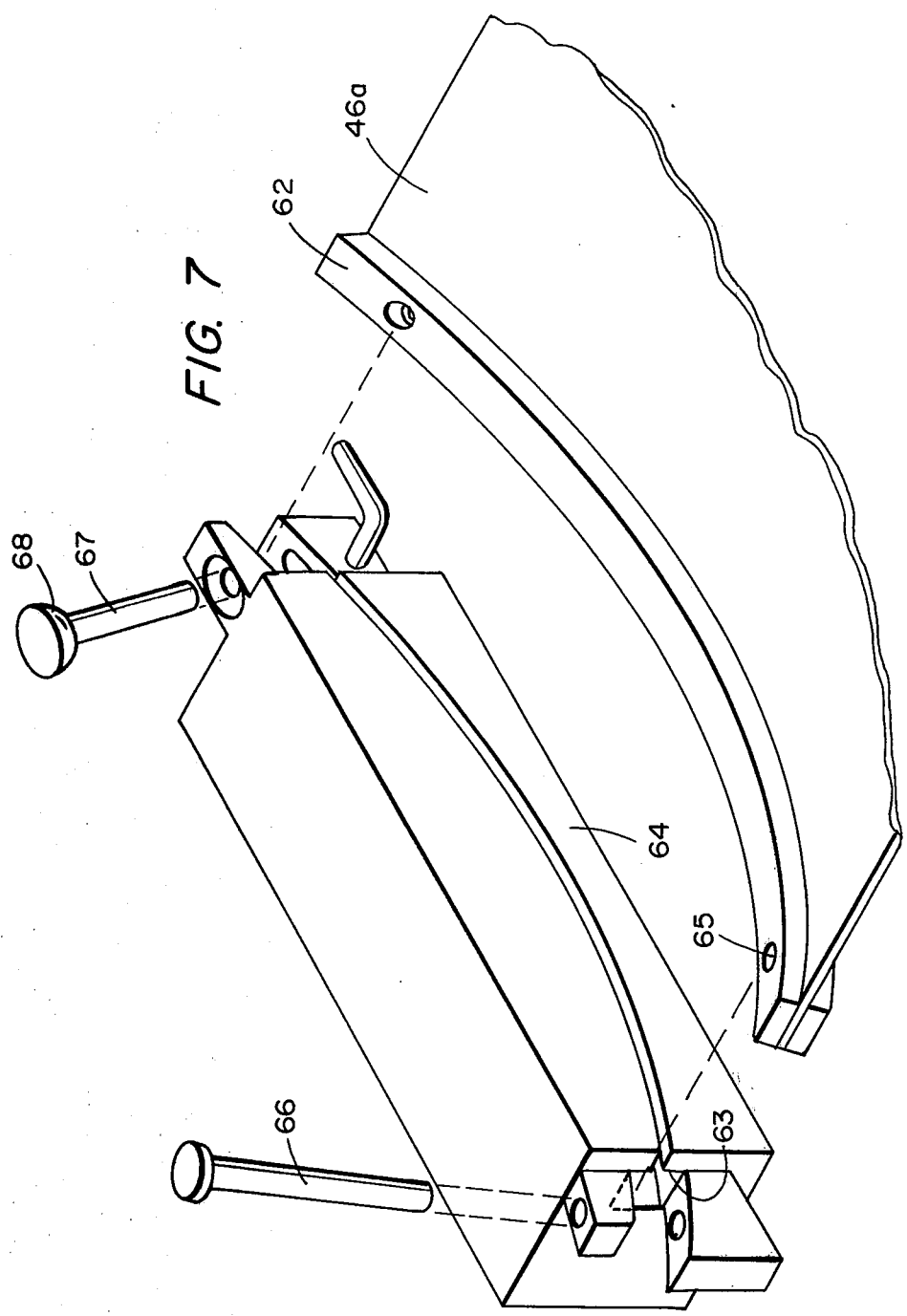
FIG. 7 is a partial view in perspective showing another type of sheet securing means.

The Embodiment of FIGS. 7 and 8

In this embodiment, the flexible sheet 46a has strips 62 of a thicker reinforcing plastic along its edges which are received in arcuate grooves 63 of a form 64. Holes 65 in the strips 62 are engaged by pins 66 and 67. One of the pins 67 has a sperical surface 68 on a head so that it can pivot in the manner of pin 43 (FIG. 5). Hence, a similar eccentric 60 can be turned to pivot the pin 67 and tension the strip 62 and flexible sheet 46a.

While this invention has been described in conjunction with the preferred embodiment thereof, it is obvious that modifications and changes therein may be made by those skilled in the art to which it pertains without departing from the spirit and scope of this invention, as defined by the claims appended hereto.

What is claimed as invention is:

1. A solar reflector comprising:
   a longitudinal slideway;
   a pair of parallel form members carried on said slideway;
   said form members having identical, form surfaces along a portion of the periphery thereof;
   a flexible sheet of a material having a reflective surface;
   means on said form members securing opposite edges of said flexible sheet tightly around said form surfaces;
   a slide member slidable along said slideway;
   one of said form members being supported on said slide member; and
   positive mechanical means for moving said slide member to tension said flexible sheet.

2. The solar reflector defined by claim 1 wherein said last-named means comprises:
   an anchor secured to said slideway; and
   screw means rotatable in one of said anchor and slide member and thread into the other thereof.

3. The solar reflector defined by claim 1 including:
   perforations along said opposite edges of the flexible sheet; and
   pins on said form members at opposite ends of said form surfaces engaging in said perforations.

4. The solar reflector defined by claim 3 including:
   a pair of straps each secured at one end to one of said form members at one end of said form surface; and
   releasable complementary securing means at the other ends of said strap and said form surface.

5. The solar reflector defined by claim 3 wherein:
   one of said pins on each form member is adjustable along said form surface.

6. The solar reflector defined by claim 1 wherein:
   said form surfaces are convex curves.

7. The solar reflector defined by claim 6 including:
   at least one additional convex curved surface on each of said form members arranged in series with said convex curve surface to form multiple troughs.

8. The solar reflector defined by claim 1 including:
   a strip of tape adhered across the back of said flexible sheet.

9. The solar reflector defined by claim 8 wherein:
   said tape is of a foam material.

10. The solar reflector defined by claim 1 including:
    strips of refinforcing material secured along said opposite edges of the flexible sheet.

11. The solar reflector defined by claim 1 including:
    spaced support members;
    said slideway being pivoted at opposite ends thereof to said support member so as to be tiltable.

12. The solar reflector defined by claim 1 including:
    complementary alignment means on said form members engagable when same are moved together to ensure that corresponding elements of said convex surfaces are in alignment.

13. The solar reflector defined by claim 6 wherein:
    said convex curves are parabolic.

14. The solar reflector defined by claim 6 wherein:
    said convex curves are cylindrical.

* * * * *